(12) United States Patent
Ackerman et al.

(10) Patent No.: US 11,657,133 B2
(45) Date of Patent: May 23, 2023

(54) SYSTEMS AND METHODS OF MULTI-MODAL BIOMETRIC ANALYSIS

(71) Applicant: Princeton Identity, Inc., Hamilton, NJ (US)

(72) Inventors: David Alan Ackerman, Hopewell, NJ (US); Barry E. Mapen, Stonington, CT (US); John Timothy Green, Lisbon, CT (US); Matthew Richard Rusnock, Monroe Townsphip, NJ (US)

(73) Assignee: Princeton Identity, Inc., Hamilton, NJ (US)

(*) Notice: Subject to any disclaimer, the term of this patent is extended or adjusted under 35 U.S.C. 154(b) by 341 days.

(21) Appl. No.: 16/772,663

(22) PCT Filed: Dec. 13, 2018

(86) PCT No.: PCT/US2018/065434
§ 371 (c)(1),
(2) Date: Jun. 12, 2020

(87) PCT Pub. No.: WO2019/118716
PCT Pub. Date: Jun. 20, 2019

(65) Prior Publication Data
US 2020/0311238 A1 Oct. 1, 2020

Related U.S. Application Data

(60) Provisional application No. 62/598,178, filed on Dec. 13, 2017.

(51) Int. Cl.
*G06F 21/32* (2013.01)
*G06F 21/83* (2013.01)
*G06V 40/16* (2022.01)

(52) U.S. Cl.
CPC .............. *G06F 21/32* (2013.01); *G06F 21/83* (2013.01); *G06V 40/16* (2022.01)

(58) Field of Classification Search
CPC .......... G06F 21/32; G06F 21/83; G06V 40/16
See application file for complete search history.

(56) References Cited

U.S. PATENT DOCUMENTS

| 10,769,465 B2 * | 9/2020 | Zhang | G06V 40/63 |
| 2014/0201844 A1 * | 7/2014 | Buck | G06F 21/554 726/26 |
| 2015/0347734 A1 | 12/2015 | Beigi | |

(Continued)

*Primary Examiner* — Jeff Piziali
(74) *Attorney, Agent, or Firm* — McCarter & English, LLP (57) ABSTRACT

Exemplary embodiments are directed to a multi-modal biometric analysis system including one or more illumination sources, one or more cameras, and a processing device. The illumination sources are configured to illuminate an iris of a subject. The cameras are configured to capture one or more images of the subject during illumination of the subject with the one or more illumination sources. The images include iris biometric data associated with the iris of the subject and face biometric data associated with a face of the subject. The processing device receives as input the one or more images, analyzes the iris biometric data for iris biometric authenticity, analyzes the face biometric data for face biometric authenticity, and compares the iris biometric data and the face biometric data to determine the biometric authenticity of the subject.

19 Claims, 6 Drawing Sheets

(56) References Cited

U.S. PATENT DOCUMENTS

2016/0117544 A1\* 4/2016 Hoyos ................... G06V 40/19
  348/78
2017/0344793 A1   11/2017 Xue et al.
2019/0213312 A1\* 7/2019 Tussy ................... G06V 40/40

\* cited by examiner

SYSTEMS AND METHODS OF MULTI-MODAL BIOMETRIC ANALYSIS

CROSS-REFERENCE TO RELATED APPLICATIONS

The present application is a national phase application of, and claims the benefit of priority to, International Patent Application No. PCT/US2018/065434, filed Dec. 13, 2018, which claims the benefit of priority to U.S. Provisional Patent Application No. 62/598,178, filed Dec. 13, 2017, the entire contents of each of the foregoing patent applications incorporated herein by reference.

TECHNICAL FIELD

The present disclosure relates to systems and methods of multi-modal biometric analysis and, in particular, to systems that determine biometric authenticity based on a combination of biometric modalities.

BACKGROUND

Security is a concern in a variety of transactions involving private information. Iris recognition is a well-accepted and accurate means of biometric identification used in government and commercial systems around the world that enables secure transactions and an added layer of security beyond keys and/or passwords. Due to the increased security provided by iris recognition systems, an increase in use of such systems has occurred around the world.

As biometric identification increases in use, attacks on systems that use biometrics for security may also increase resulting in a greater demand for anti-spoofing measures. In particular, the security of such systems can be threatened by presentation of spoof attacks (attacks that present the biometric system with facsimiles of the real biometric credentials in an attempt to defraud the biometric system). Banks, hospitals, schools, stores, businesses, military installations, and other government and/or commercial systems could benefit from biometric security that is hardened against spoofing attacks.

Those looking to defraud iris recognition systems generally attempt to use a wide variety of attacks. In the presentation attack, the defrauder can present a fraudulent, non-live iris in place of a live biometric organ to the recognition system. For example, the defrauder can present a picture of an iris in place of a real iris. The fraudulent iris can be so realistic in every aspect that the iris recognition system can mistake it for a real iris that is enrolled in the system, mistakenly verifying its identity and granting the defrauder access to the otherwise protected system. In some cases, anti-spoofing strategies aim to measure the liveness of a subject to distinguish a live subject from a lifeless presentation spoof. In other cases, liveness is not measured and instead another characteristic of a spoof, such as lack of a three-dimensional structure, is determined. The defeat of iris biometrics using simple image-based spoofing could tarnish the reputation of iris biometrics.

A need exists for improved biometric analysis systems to ensure the security of transactions and make presentation attacks more difficult. These and other needs are addressed by the systems and methods of the present disclosure.

SUMMARY

In accordance with embodiments of the present disclosure, an exemplary multi-modal biometric analysis system is provided that includes one or more illumination sources, one or more cameras, and one or more processing devices. The one or more illumination sources can be configured to illuminate an iris of a subject. The one or more cameras can be configured to capture one or more images of the subject during illumination of the subject with the one or more illumination sources. In some embodiments, the one or more illumination sources can include a single illumination source that illuminates both the iris and the face of the subject. In some embodiments, the one or more illumination sources can include separate illumination sources for individually illuminating the iris and the face of the subject. In some embodiments, the one or more cameras can include a single camera that is capable of capturing images of both the iris and the face of the subject. In some embodiments, the one or more cameras can include separate cameras capable of individually capturing images of the iris and face of the subject.

The one or more images can include iris biometric data associated with the iris of the subject and face biometric data associated with a face of the subject. The processing device can be in wired and/or wireless communication with the one or more illumination sources and the one or more cameras. In some embodiments, the system can include a single or master processing device that operates with the illumination sources and cameras for multiple modalities. In some embodiments, the system can include separate processing devices that operate with the individual illumination sources and cameras for each modality. The processing device can be configured to receive as input the one or more images, analyze the iris biometric data for iris biometric authenticity, analyze the face biometric data for face biometric authenticity, and compare the iris biometric data and the face biometric data to determine the biometric authenticity of the subject. Although discussed herein as iris and face biometric data, it should be understood that any combination of two or more biometric modalities can be used to determine the biometric authenticity of the subject.

In some embodiments, the one or more illumination sources can include an iris illumination source and a face illumination source. The iris illumination source can be configured to illuminate the iris of the subject with near infrared (NIR) light. The face illumination source can be configured to illuminate at least a portion of the face of the subject. The face illumination source can be configured to illuminate the face of the subject with visible and/or NIR light.

In some embodiments, the iris biometric authenticity can include at least one of corneal reflections, and retinal retro-reflection. In some embodiments, the iris biometric authenticity can include skin texture under near infrared light and the face biometric authenticity can include skin texture under visible light. In some embodiments, the face biometric authenticity can include at least one of facial shadow identification, and eye position detection. In some embodiments, the one or more illumination sources can be configured to illuminate the face of the subject at varying time sequences. In such embodiments, the face biometric authenticity can include detection of time-varying facial shadows. In some embodiments, the one or more illumination sources can include two or more off-axis illumination sources configured to illuminate the face of the subject from spatially separated directions. In some embodiments, two or more off-axis illumination sources can illuminate the face of the subject during different and/or overlapping time periods, and the camera can be used to capture images indicating "shadow shifts" based on the direction of the illumination sources.

In some embodiments, the system can include at least one of a fingerprint scanner, a voice detector, a gait detector, a palm scanner, and an infrared palm scanner. The fingerprint scanner can be configured to capture one or more images of a fingerprint of the subject. The processing device can be configured to receive as input the one or more images of the fingerprint of the subject, analyze the one or more images of the fingerprint of the subject for fingerprint biometric authenticity, and compare the fingerprint biometric authenticity with at least one of the iris biometric data and the face biometric data to determine the biometric authenticity of the subject.

The voice detector can be configured to capture one or more audio signals corresponding with a voice of the subject. The processing device can be configured to receive as input the one or more audio signals corresponding with the voice of the subject, analyze the one or more audio signals for voice biometric authenticity, and compare the voice biometric authenticity with at least one of the iris biometric data and the face biometric data to determine the biometric authenticity of the subject.

The gait detector can be configured to capture one or more images of a gait of the subject. The processing device can be configured to receive as input the one or more images of the gait of the subject, analyze the one or more images of the gait of the subject for gait biometric authenticity, and compare the gait biometric authenticity with at least one of the iris biometric data and the face biometric data to determine the biometric authenticity of the subject.

The palm scanner can be configured to capture one or more images of the palm of the subject, e.g., the physical structures of the palm, the shape of the palm, the dimensions associated with the palm, the dimensions associated with the fingers, combinations thereof, or the like. The processing device can be configured to receive as input the one or more images from the palm scanner, analyze the one or more images for structural palm biometric authenticity, and compare the structural palm biometric authenticity with at least one of the iris biometric data and the face biometric data to determine the biometric authenticity of the subject. As an example, the images can be used to measure the unique geometry of the subject's hand, and can be captured by facing the palm down against a scanner or reader.

The infrared palm scanner can be configured to capture one or more images of the veins of the subject, e.g., infrared light can be used to detect and display the location of veins in the palm and/or fingers of the subject, referred to herein as the palm vein structure. The processing device can be configured to receive as input the one or more images from the infrared palm scanner, analyze the one or more images for palm vein biometric authenticity, and compare the palm vein biometric authenticity with at least one of the iris biometric data and the face biometric data to determine the biometric authenticity of the subject. As an example, the images can capture the palm side of the subject, particularly the venal structure imaged with NIR light.

In accordance with embodiments of the present disclosure, an exemplary method of authentication of a multi-modal biometric analysis system is provided. The method includes illuminating an iris of a subject with one or more illumination sources. The method includes capturing one or more images of the subject with one or more cameras during illumination of the subject with the one or more illumination sources. The one or more images include iris biometric data associated with the iris of the subject and face biometric data associated with a face of the subject. The method includes receiving as input at a processing device the one or more images. The method includes analyzing, via the processing device, the iris biometric data for iris biometric authenticity. The method includes analyzing, via the processing device, the face biometric authenticity. The method includes comparing, via the processing device, the iris biometric data and the face biometric data to determine the biometric authenticity of the subject.

In some embodiments, the method can include capturing one or more images of a fingerprint of the subject with a fingerprint scanner. In such embodiments, the method includes receiving as input the one or more images of the fingerprint of the subject, analyzing the one or more images of the fingerprint of the subject for fingerprint biometric authenticity, and comparing the fingerprint biometric authenticity with at least one of the iris biometric data and the face biometric data to determine the biometric authenticity of the subject.

In some embodiments, the method can include capturing one or more audio signals corresponding with a voice of the subject with a voice detector. In such embodiments, the method includes receiving as input the one or more audio signals corresponding with the voice of the subject, analyzing the one or more audio signals for voice biometric authenticity, and comparing the voice biometric authenticity with at least one of the iris biometric data and the face biometric data to determine the biometric authenticity of the subject.

In some embodiments, the method can include capturing one or more images of a gait of the subject with a gait detector. In such embodiments, the method includes receiving as input the one or more images of the gait of the subject, analyzing the one or more images of the gait of the subject for gait biometric authenticity, and comparing the gait biometric authenticity with at least one of the iris biometric data and the face biometric data to determine the biometric authenticity of the subject.

In some embodiments, the method can include capturing one or more images of a palm structure of the subject with a palm scanner. In such embodiments, the method includes receiving as input the one or more images of the palm structure of the subject, analyzing the one or more images of the palm structure of the subject for structural palm biometric authenticity, and comparing the structural palm biometric authenticity with at least one of the iris biometric data and the face biometric data to determine the biometric authenticity of the subject.

In some embodiments, the method can include capturing one or more images of a palm vein structure of the subject with an infrared palm scanner. In such embodiments, the method includes receiving as input the one or more images of the palm vein structure of the subject, analyzing the one or more images of the palm vein structure of the subject for palm vein biometric authenticity, and comparing the palm vein biometric authenticity with at least one of the iris biometric data and the face biometric data to determine the biometric authenticity of the subject.

In accordance with embodiments of the present disclosure, an exemplary non-transitory computer-readable medium storing instructions for multi-modal biometric analysis system authentication is provided. The instructions are executable by a processing device. Execution of the instructions by the processing device causes the processing device to illuminate an iris of a subject with one or more illumination sources, and capture one or more images of the subject with one or more cameras during illumination of the subject with the one or more illumination sources. The one or more images include iris biometric data associated with the iris of the subject and face biometric data associated with a face of the subject.

Execution of the instructions by the processing device causes the processing device to receive as input at the processing device the one or more images. Execution of the instructions by the processing device causes the processing device to analyze, via the processing device, the iris biometric data for iris biometric authenticity. Execution of the instructions by the processing device causes the processing device to analyze, via the processing device, the face biometric authenticity. Execution of the instructions by the processing device causes the processing device to compare, via the processing device, the iris biometric data and the face biometric data to determine the biometric authenticity of the subject.

In accordance with embodiments of the present disclosure, an exemplary multi-modal biometric analysis system is provided that includes one or more illumination sources, one or more cameras, and a processing device. The one or more illumination sources can be configured to illuminate a portion of a subject. The one or more cameras can be configured to capture one or more images of the subject during illumination of the subject with the one or more illumination sources. The one or more images include first biometric data and second biometric data associated with the subject. The processing device is in communication with the one or more illumination sources and the one or more cameras. The processing device configured to receive as input the one or more images, analyze the first biometric data for first biometric authenticity, analyze the second biometric data for second biometric authenticity, and compare the first biometric data and the second biometric data to determine the biometric authenticity of the subject.

In some embodiments, the first biometric data can be iris biometric data associated with the subject. In some embodiments, the second biometric data can be face biometric data associated with the subject. In some embodiments, the first and second biometric data are at least one of iris biometric data, face biometric data, fingerprint biometric authenticity, voice biometric authenticity, gait biometric authenticity, structural palm biometric authenticity, and palm vein biometric authenticity. For example, the first and second biometric data can be two or more different types of biometric data associated with the subject.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed multi-modal biometric analysis systems and methods, reference is made to the accompanying figures, wherein.

DESCRIPTION OF EXEMPLARY EMBODIMENTS

In accordance with embodiments of the present disclosure, exemplary multi-modal biometric analysis systems are provided that verify whether a subject is alive based on a combination of multiple biometric modalities. In particular, the exemplary multi-modal biometric analysis systems provide additional layers of biometric security by individually analyzing the biometric authenticity of multiple modalities, and comparing the results of the individual biometric authenticity results to determine a final authenticity of the subject (e.g., whether the subject is alive or a spoof). The biometric analysis systems are therefore used to initially determine and confirm that the subject is alive (and not a spoof), prior to proceeding with authenticating the subject for a biometric match. Such sequential operation reduces the operational time for the biometric analysis systems such that if it is determined that the subject is not alive (e.g., a spoof), authentication based on a biometric match is not needed. In some embodiments, determination of whether the subject is alive and whether a biometric match exists can be performed substantially simultaneously, or the biometric match analysis can be performed prior to the determination of whether the subject is alive.

In some embodiments, the multiple biometric modalities include biometric features associated with an iris, face, fingerprint, voice, gait, palm structure, and/or palm vein structure of the subject. Although discussed herein as a combination of iris and face biometric authentication, it should be understood that the exemplary systems can use any combination of two or more modalities. By relying on multiple biometric modalities for final authenticity of the subject, the level of difficulty for a spoof attack is increased. Particularly, relying on multiple modality authentication systems offers unique opportunities to sense spoof attacks unavailable to individual modality systems. The exemplary systems can be used to authenticate a subject by matching biometric features against an enrollment database. Therefore, the hardware and/or software of the exemplary system 100 can be used as an identification system once a subject is verified or authenticated as being real and not a spoof. In some embodiments, if the two or more biometric modalities can be captured using similar hardware or algorithmic analyses, the combination of such biometric modalities offers a cost-effective and simpler system 100 construction. Reduction of cost and complexity provide advantages to system 100 design. Thus, in some embodiments, the multiple biometric modalities used can be synergistic.

Figure 1:
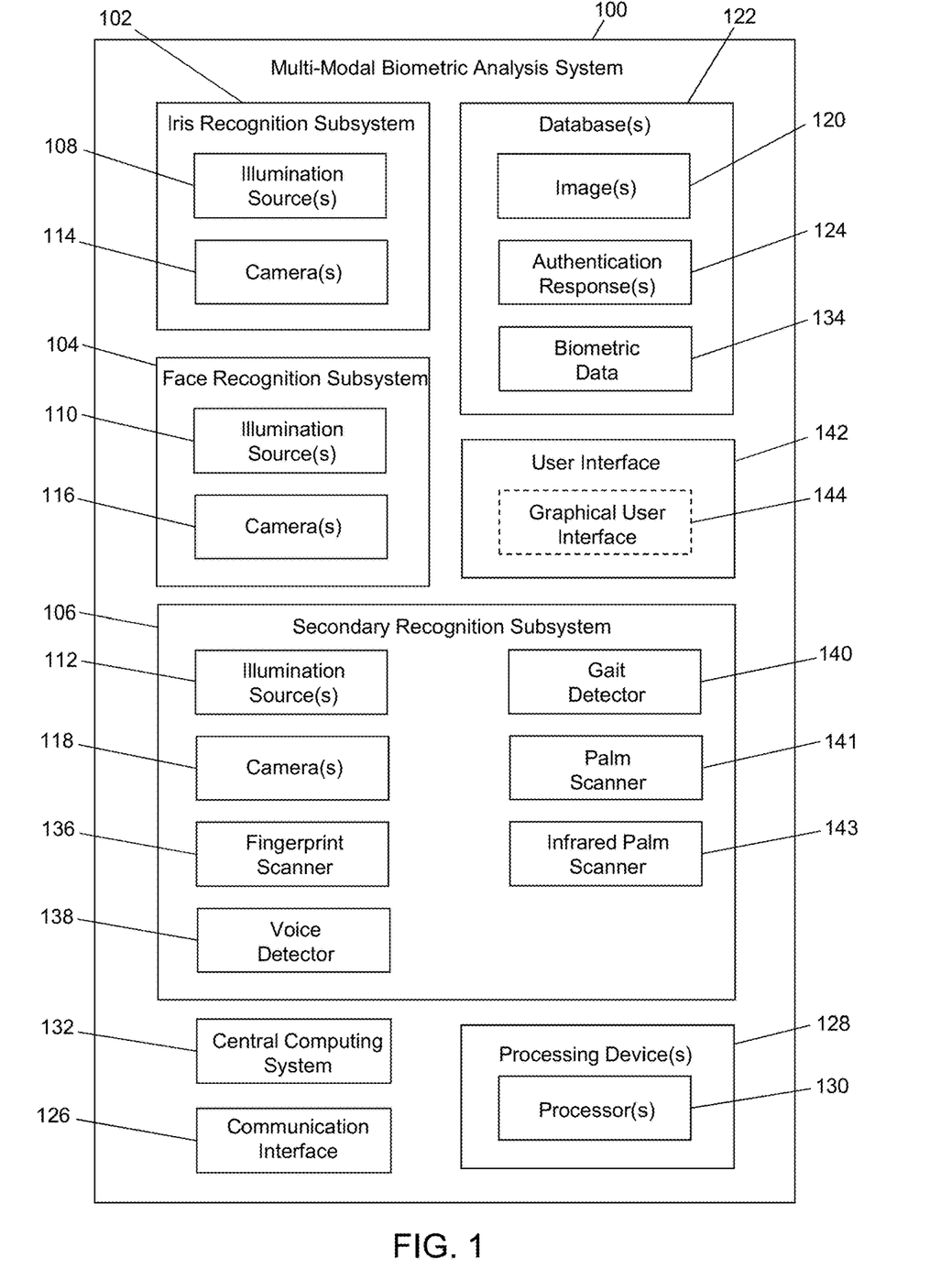
FIG. 1 is a block diagram of an exemplary multi-modal biometric analysis system in accordance with the present disclosure.

With reference to FIG. 1, a block diagram of an exemplary multi-modal biometric analysis system 100 (hereafter "system 100") is provided. The system 100 generally includes an iris recognition subsystem 102, a face recognition subsystem 104, and a secondary recognition subsystem 106. Although illustrated as separate components of the system 100, in some embodiments, the subsystems 102-106 can be part of a single subsystem. For example, the face recognition subsystem 104 can be part of the secondary recognition subsystem 106. The subsystems 102-106 each include one or more illumination sources 108-112 and one or more cameras 114-118. Particularly, the subsystems for detecting modalities of the subject (e.g., iris, face, fingerprint, voice, gait, palm structure, and/or palm vein structure) can be separate structural components of the system 100 or can be combined in a variety of combinations into one or more structural components of the system 100.

The illumination source 108 is configured to illuminate one or both irises of the subject. The illumination source 110 is configured to illuminate at least a portion of the face of the subject. The illumination source 112 is configured to illuminate one or more additional portions of the subject. In some embodiments, a single illumination source can be used to illuminate the iris, face and/or additional portions of the subject. Such illumination can occur simultaneously or synchronously.

In some embodiments, multiple independent illumination sources can be used to selectively illuminate the iris, face and/or additional portions of the subject. For example, two illumination sources 110 can be used to illuminate the face of the subject from different spatial positions at different time periods, thereby generating different shadows on the face of the subject. In some embodiments, a single illumination source 110 can be used to illuminate the face of the subject during predetermined or varying time periods, thereby generating periods of darkness and periods of shadows on the face of the subject. In some embodiments, the illumination source 108 can be near infrared light. In some embodiments, the illumination sources 110, 112 can be, e.g., ambient light in the environment surrounding the subject during use of the system 100, light-emitting diodes (LEDs), near infrared light, and the like.

The camera 114 of the subsystem 102 can be configured to capture one or more images 120 of at least a portion of the subject (such as the iris(es) and/or surrounding regions of the face) during illumination of the subject with the illumination source 108. The camera 114 can include a lens and filter, and the illumination source 108 can include at least one source of near infrared (NIR) light.

The images 120 can be electronically transmitted to and stored in one or more databases 122. Each image 120 can include or display iris biometric data associated with the iris of the subject, and can be used by the system 100 to determine the iris biometric authenticity. The iris biometric authenticity indicates to the system 100 whether the subject is alive or a spoof. In some embodiments, the database 122 can include authentication responses 124 electronically captured and stored by the system 100 during, e.g., enrollment of the subject.

The system 100 can include a communication interface 126 configured to provide for a communication network between components of the system 100, thereby allowing data to be transmitted and/or received by the components of the system 100. The system 100 can include a processing device 128 with a processor 130 for receiving and processing the data captured by the camera 114. In some embodiments, the processing device 128 can receive the data captured by the camera 114 and electronically transmits such captured data to a central computing system 132 for analysis and processing. The processing device 128 can be programmed to control operation of the camera 114 and illumination source 108, ingests or receives as input camera imagery, analyzes the camera imagery, and contributes to the determination of whether the subject is real (e.g., live) or a spoof.

As an example, the iris biometric data contained in the images 120 captured by the camera 114 can be transmitted to the processing device 128, and the processing device 128 can determine the iris biometric authenticity of the subject based on the authentication responses 124 stored in the database 122 (e.g., whether the subject is real/alive or a spoof). Successful and failed attempts of finding iris biometric authenticity can be electronically stored as biometric data 134 in the database 122 such that the system 100 can rely on historical biometric data for improving operation of the system 100. In some embodiments, the iris biometric authenticity can be determined based on corneal reflections, retinal retro-reflection, skin texture under near infrared light, combinations thereof, or the like. For example, if the subsystem 102 determines that corneal reflections are not detected in the images 120, the system 100 can output that subject is determined to be a spoof.

The camera 116 of the subsystem 104 can be configured to capture one or more images 120 of at least a portion of the face of the subject during illumination of the subject with the illumination source 110. The camera 116 includes a lens and filter, and the illumination source 110 provides ambient light, visible light, NIR illumination, combinations thereof, or the like. The images 120 from the camera 116 are also electronically transmitted and stored in the database 122. Each image 120 from the camera 116 can include or display face biometric data associated with the face of the subject, and can be used by the system 100 to determine the face biometric authenticity. The face biometric authenticity indicates to the system 100 whether the subject is alive or a spoof.

The authentication responses 124 can include data corresponding to, e.g., enrollment of the subject, for determination of the face biometric authenticity. In some embodiments, the face biometric authenticity can be determined based on skin texture under visible light, facial shadow identification, eye position detection, combinations thereof, or the like. Determination of the face biometric authenticity can be performed by the processing device 128 and/or the central computing system 132. The processing device 128 can be programmed to control the camera 116 and illumination source 110, ingest or receive as input the camera imagery, analyzes the camera imagery, and contributes to the determination of whether the subject is real (e.g., live) or a spoof. In some embodiments, a single master processing device can be used to receive and analyze the imagery for both the subsystems 102, 104.

In some embodiments, the illumination source 110 can be configured to illuminate the face of the subject at varying time sequences or intervals, thereby leaving the face of the subject in substantially complete shadows or illuminating the face of the subject to create shadows at varying or predetermined intervals of time. In such embodiments, the face biometric authenticity can be determined based on detection of time-varying facial shadows. In some embodiments, the illumination source 110 can include two or more off-axis illumination sources 110 configured to illuminate the face of the subject from spatially separated directions at different times. In such embodiments, the face biometric authenticity can be determined based on the difference in the shadows on the face of the subject due to the different positions of the illumination sources 110 (e.g., shadow shifting on the face of the subject due to illumination during different periods of time, illumination from different sides of the subject, illumination from different sides of the subject during different or overlapping periods of time, combinations thereof, or the like). For example, if the subsystem 104 determines that the shadows are the same or nonexistent, the system 100 can output that the subject is determined to be a spoof.

Once the iris biometric authenticity and the face biometric authenticity are determined, the processing device 128 and/or the central computing system 132 can compare the iris and face biometric authenticities to determine the final biometric authenticity of the subject. Thus, rather than relying on a single biometric authenticity, the system 100 relies on a combination of multiple biometric modalities to ensure a more accurate authentication determination.

In some embodiments, the subsystem 106 can include a fingerprint scanner 136, a voice detector 138, a gait detector 140, a palm scanner 141, an infrared palm scanner 143, combinations thereof, or the like. The subsystem 106 provides additional biometric modalities that can be analyzed by the system separately from or in combination with the iris and/or face biometric data. Although discussed herein as a comparison of the iris and face biometric data, or a comparison of fingerprint biometric data, voice biometric data, gait biometric data, and/or palm biometric data to either iris and/or face biometric data, it should be understood that any combination of two or more modalities can be used by the system 100 to authenticate the subject. The biometric data analysis performed by the system 100 therefore does not need to include iris and/or face biometric data, and can involve any combination of two or more biometric modalities. Thus, two or more biometric data can be compared for determination of the final biometric authenticity of the subject.

In embodiments of the system 100 including the fingerprint scanner 136, prior authentication, enrollment scans of one or more fingerprints of the subject can be electronically stored in the authentication responses 124. The fingerprint scanner 136 captures one or more images 120 of a fingerprint of the subject, with such images 120 including fingerprint biometric data. The fingerprint biometric data is analyzed to determine the fingerprint biometric authenticity, which can be compared to any biometric authenticity discussed herein. Combinations of two or more biometric modalities are therefore analyzed and compared to determine the authenticity of the subject (e.g., whether the subject is alive or a spoof).

In embodiments of the system 100 including the voice detector 138, prior authentication, enrollment recordings of the subject can be electronically stored in the authentication responses 124. The voice detector 138 can include a microphone to capture one or more audio signals corresponding with the subject, with such audio signals or recordings including voice biometric data. The voice biometric data is analyzed to determine the voice biometric authenticity, which can be compared to any biometric authenticity discussed herein. Combinations of two or more biometric modalities are therefore analyzed and compared to determine the authenticity of the subject (e.g., whether the subject is alive or a spoof).

In embodiments of the system 100 including the gait detector 140, prior authentication, enrollment images of the subject can be electronically stored in the authentication responses 124. The gait detector 140 (and/or the camera 118) captures one or more images 120 of the gait of the subject, with such images 120 including gait biometric data. The gait biometric data is analyzed to determine the gait biometric authenticity, which can be compared to any biometric authenticity discussed herein. Combinations of two or more biometric modalities are therefore analyzed and compared to determine the authenticity of the subject (e.g., whether the subject is alive or a spoof).

In embodiments of the system 100 including the palm scanner 141, prior to authentication, enrollment images of the subject can be electronically stored in the authentication responses 124. The palm scanner 141 (and/or the camera 118) captures one or more images 120 of the physical structures of the palm of the subject, with such images 120 including the structural palm biometric data (e.g., the shape of the palm, the dimensions associated with the palm, the dimensions associated with the fingers, combinations thereof, or the like). The structural palm biometric data is analyzed to determine the structural palm biometric authenticity, which can be compared to any biometric authenticity discussed herein. Combinations of two or more biometric modalities are therefore analyzed and compared to determine the authenticity of the subject (e.g., whether the subject is alive or a spoof).

In embodiments of the system 100 including the infrared palm scanner 143, prior to authentication, enrollment images of the subject can be electronically stored in the authentication responses 124. The infrared palm scanner 143 (and/or the camera 118) captures one or more images 120 of the vein structures of the palm of the subject, with such images 120 including the vein palm biometric data (e.g., the location and size of the veins). The vein palm biometric data is analyzed to determine the vein palm biometric authenticity, which can be compared to any biometric authenticity discussed herein. Combinations of two or more biometric modalities are therefore analyzed and compared to determine the authenticity of the subject (e.g., whether the subject is alive or a spoof).

The system 100 includes a user interface 142. In some embodiments, the user interface 142 can include a display in the form of a graphical user interface (GUI) 144. In some embodiments, the interface 144 can include a numerical (or alphanumerical display), the fingerprint scanner 136, the microphone associated with the voice detector 138, any of the illumination sources 108-112, any of the cameras 114-118, combinations thereof, or the like. Instructions for properly using the system 100 can be provided to the user via the GUI 144. The GUI 144 can include one or more displays or indicators for communicating information to the subject, and can be local to or remote from the subsystems 102-106.

In some embodiments, using static two-dimensional imaging, the system 100 can discriminate between live and spoof biometric features, e.g., faces or irises, based on interaction between the features and applied light. As noted above, the exemplary spoof detection system 100 combines multiple modalities and features to increase the level of difficulty of a successful spoof. As an example, the iris recognition subsystem 102 can collect and analyze data relating to corneal reflections and retinal retro-reflection (red- or infrared-eye), while the face recognition subsystem 104 can collect and analyze data relating to differences in apparent skin texture and shadowing appearing under different spectra of applied illumination and with spatially separate illumination sources 110.

Used independently, the proposed techniques are applicable to face and iris spoof testing. Combining face and iris anti-spoofing strategies compounds the difficulty of a successful spoof. As an example, the face recognition subsystem 104 can be used to provide detected eye positions to the iris recognition subsystem 102. The iris recognition subsystem 102 can scan for proper corneal reflections in the near infrared spectrum corresponding to the illumination source 108, while the face recognition subsystem 104 can scan for proper and distinct corneal reflections corresponding to the illumination source 110. If no face illumination is used, the face recognition subsystem 104 can scan for the absence of infrared corneal reflections.

As a further example, the iris recognition subsystem 102 can collect and detect skin texture under near infrared illumination that can be compared to skin texture acquired by the face recognition subsystem 104 under visible illumination. Since infrared and visible light interact differently with human skin, distinct textural differences generally appear for a live subject (e.g., wrinkles in the visible that are not apparent in infrared light). Alternatively, or in combination, illumination sources 108, 110 close to the camera 116 face and iris camera 114 axes can intentionally create red-eye (or infrared-eye) to test liveness while alternately or in combination, separate visible or NIR illumination sources 108 can create time-varying shadows on a subject's face.

The exemplary system 100 therefore exploits different multi-modal methods to discriminate against spoof biometric features. Combining the disclosed methods in a logical flow can achieve the goal of hardening or strengthening the system 100 against spoof attacks. Examples of the different multi-modal methods are provided below. In some embodiments, the biometric authentication involves the process of near infrared eye finding using the face recognition subsystem 104. In such process, the subsystem 104 looks for a two-dimensional or three-dimensional face in the captures images 120 using a face recognition algorithm. The eye finding algorithm can accept biometric images 120 of reasonably posed faces that contain eyes and such images 120 are subsequently tested for authenticity.

Ill-posed faces, such as faces with no eyes visible, subjects facing away from the camera 116, or subjects with eyes occluded by sunglasses, hair or headwear, would be discriminated against or rejected. With such images 120, the system 100 can request that the subject reposition themselves for a subsequent image capture, thereby providing a subsequent opportunity to capture an acceptable image 120. If tested in the NIR spectrum, the exemplary eye finding process can be used to discriminate against presentation spoofs that use liquid-crystal display (LCD) screens to display faces and irises.

In some embodiments, the biometric authentication involves the process of examining NIR corneal specular reflections using the iris recognition subsystem 102. In such process, the subsystem 102 can looks for the proper shape and/or size reflections of the cornea in the captured images 120. The illumination sources 108 can create specular reflections on the cornea(s) of the subject's eye(s). The reflections captured in the images 120 can show distorted images of the NIR illumination sources 108 and therefore exhibit a correct number of illumination sources 108 with the correct configuration.

The absence of the expected reflections, an incorrect shape of the reflections, and/or an incorrect number of illumination sources 108 in a reflection can be a sign of a spoof. The system 100 can also discriminate or reject images 120 having partially closed or obscured corneas. In this process, the face recognition subsystem 104 can be used to locate the eyes of the subject, and the iris recognition subsystem 102 can be used to test the authenticity of the corneal reflections. If contact lenses applied to a two-dimensional or three-dimensional face facsimile are used to spoof the system 100, additional biometric modalities can be used to supplement the findings of the exemplary process.

In some embodiments, the biometric authentication involves the process of providing infrared-eye using the iris recognition subsystem 102 with an auxiliary illumination source 108. For example, an iris illumination source 108 placed close to the iris camera 114 optical axis can result in NIR light reflected from the subject's retina. Retinal reflection (red-eye or infrared-eye) occurs in authentic eyes with sufficient pupil dilation. In this process, the face recognition subsystem 104 can be used to locate the eyes of the subject, and the iris recognition subsystem 102 can be used to test the captured images 120 for red-eye. Particularly, the subsystem 102 can look for bright pupils in the images 120.

A spoof eye with a patch of retro-reflective material covering the pupil could potentially spoof a system 100 trained to find red-eye provided that the patch looks black under off-axis illumination to both subsystems 102, 104. To overcome such issue, the system 100 reviews the images 120 and determines that a bright pupil under on-axis illumination is a sign of authenticity, while a black and sufficiently large pupil under on-axis illumination is a sign of a spoof. The system 100 can discriminate or reject print presentations with contact lenses, and contracted pupils (e.g., outdoor images, smokers, elderly, or the like).

In some embodiments, the biometric authentication involves the process of testing for differential NIR shadows from the illumination sources 108 using the iris recognition subsystem 102. In this process, the system 100 can look for three-dimensional facial reliefs, and can discriminate or reject images 120 having a two-dimensional presentation with contact lenses, or brightly NIR-lit faces (e.g., outdoors). The system 100 therefore focuses on detection and recognition of the facial relief of an authentic face. An authentic face shows shadows when illuminated by an off-axis illumination source 108, 110. Using two or more spatially separated illumination sources 108, 110 in either visible or NIR spectra can produce differential shadows on the face of the subject. For example, a visible light illumination source 108, 110 illuminating a face from the left casts a nose shadow on the anatomical left of a front-facing subject, while a visible light illumination source 108, 110 on the right of the subject will cast the opposite shadows on the same subject.

In the exemplary process, two or more sequential frames lit by a left- and then right-side visible light illumination source 110 of the face recognition subsystem 104 can create differential shadowing that can be detected by properly subtracting the subsequent images 120. The iris recognition subsystem 102 can perform the same process using NIR light illumination sources 108. A left-side NIR light and a right-side visible light can also be used to produce differential shadows in different spectra in the same frame. Red and blue light can also be used to produce differential shadows in different spectra in the same frame.

A two-dimensional spoof lacking in facial relief would typically not elevate differential shadowing and would not be authenticated by the system 100. The face recognition subsystem 104 therefore identifies facial features, e.g., nose, eye-sockets, combinations thereof, or the like, based on the captured images 120, and a combination of the subsystems 102, 104 produces differential shadowing that can be analyzed by the processing device 128 using a vision algorithm. Although a realistic three-dimensional facial mask might be used to spoof a system that detects differential shadows, combinations of the multi-modal methods discussed herein can be used to ensure proper authentication.

In some embodiments, the biometric authentication involves the process of testing for differential NIR and/or visible skin signatures using the subsystems 102, 104. In this process, the system 100 can look for deeper NIR skin penetration, and can discriminate or reject images 120 having non-natural three-dimensional mask materials, or subjects with sub-threshold signatures. Human skin absorbs visible and NIR light differently. Because NIR light has a deeper penetration depth, NIR face images 120 generally show fewer fine wrinkles as typically appear around the folds of the eyes. The system 100 can use the iris recognition subsystem 102 to illuminate the face in the NIR spectrum and uses the face recognition subsystem 104 to illuminate the face in the visible spectrum, producing images 120 in each spectrum that can be compared for differential penetration.

An authentic face generally shows fewer fine wrinkles under NIR compared to under visible illumination. In contrast, a two-dimensional face image 120 or a three-dimensional mask would not show fine wrinkles unless constructed of a material that has similar absorption properties to human skin. Thus, using the subsystems 102, 104 to produce face images 120 that are compared for fine details allows the system 100 to detect an authentic face where differences exceed a threshold and will otherwise cast doubt on the authenticity of a face.

For example, the system 100 can receive as input both visible and NIR images 120 covering the same area(s) or portion(s) of a face (e.g., the ocular area that includes wrinkles around the eyes). The system 100 can implement an edge detecting or finding algorithm (e.g., Canny or Sobel edge detection) that is optimized to detect wrinkle lines. Based on the detected wrinkle lines, the system 100 can determine the "wrinkliness" level of a given area of skin in both images. As used herein, "wrinkliness" can be a measure of the density of wrinkles (e.g., the lines per distance in horizontal and vertical directions) within the image 120. Because skin appears more wrinkly under the spectrum of visible light as compared to NIR light, the ratio of NIR wrinkliness divided by visible wrinkliness can be used as a metric or threshold for the authentication determination.

Authentic human skin, which is more transmissive in the NIR spectrum (e.g., approximately 850 nm) compared to the shorter wavelength visible spectrum (e.g., approximately 400 nm to 700 nm), shows fewer wrinkles under NIR light. The ratio expected for authentic skin would be less than unity. In contrast, the ratio expected for a paper image would be of unity. A three-dimensional facial mask formed from plastic or other synthetic material (e.g., non-living materials) would also be expected to have a ratio higher than that of human skin. The threshold for the authentication determination can therefore be defined as a predetermined ratio value below which the system 100 can discriminate authentic human skin from impostor skin formed from paper or plastic. Such threshold can be established experimentally and over time using measurements on real and spoof images. In some embodiments, the system 100 can determine and update the threshold value over time using a machine-learning algorithm.

It should be understood that any combination of the examples provided above can be used for determining the authenticity of the presented subject. Further, it should be understood that any of the examples discussed above can be combined with (or replaced with) one or more of the fingerprint scanner 136, voice detector 138, gait detector 140, palm scanner 141, and infrared palm scanner 143. Thus, the processes discussed herein can be used separately or in combinations, and in some embodiments can use the same base imagery to perform separate tests of authenticity. In all instances, the system 100 uses combined information from multiple modalities to construct a case as to whether the presented biometric features are real or spoof.

Figure 2:
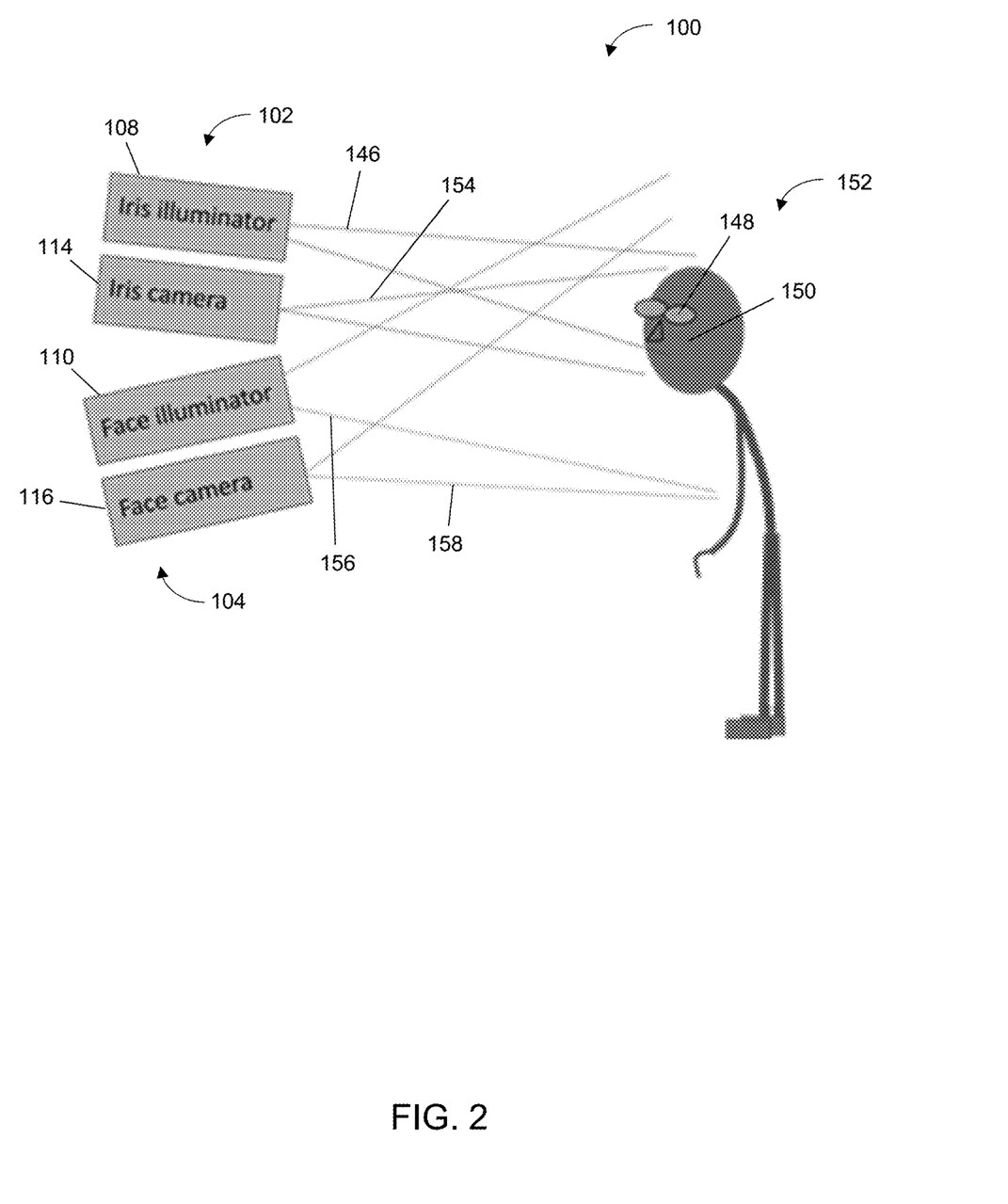
FIG. 2 is a diagrammatic representation of an exemplary multi-modal biometric analysis system including an iris recognition subsystem and a face recognition subsystem.

FIG. 2 is a diagrammatic view of the exemplary system 100, including the illumination sources 108, 110 and cameras 114, 116 for the iris and face recognition subsystems 102, 104. Although shown as separate components, it should be understood that the components of the subsystems 102, 104 can be combined and/or multiple illumination sources 108, 110 and cameras 114, 116 can be used. In the embodiment shown in FIG. 2, the iris illumination source 108 generates a light beam 146 (visible, NIR, combinations thereof, or the like) that illuminates one or more parts of the eyes 148 and/or the face 150 of the subject 152. The camera 114 of the subsystem 102 captures images 120 within a specific frame or field-of-view 154. The face illumination source 110 generates a light beam 156 (ambient, visible, NIR, combinations thereof, or the like) that illuminates one or more parts of the face 150 of the subject 152 (including the eyes 148). The camera 116 of the subsystem 104 captures images 120 within a specific frame or field-of-view 158.

Figure 3:
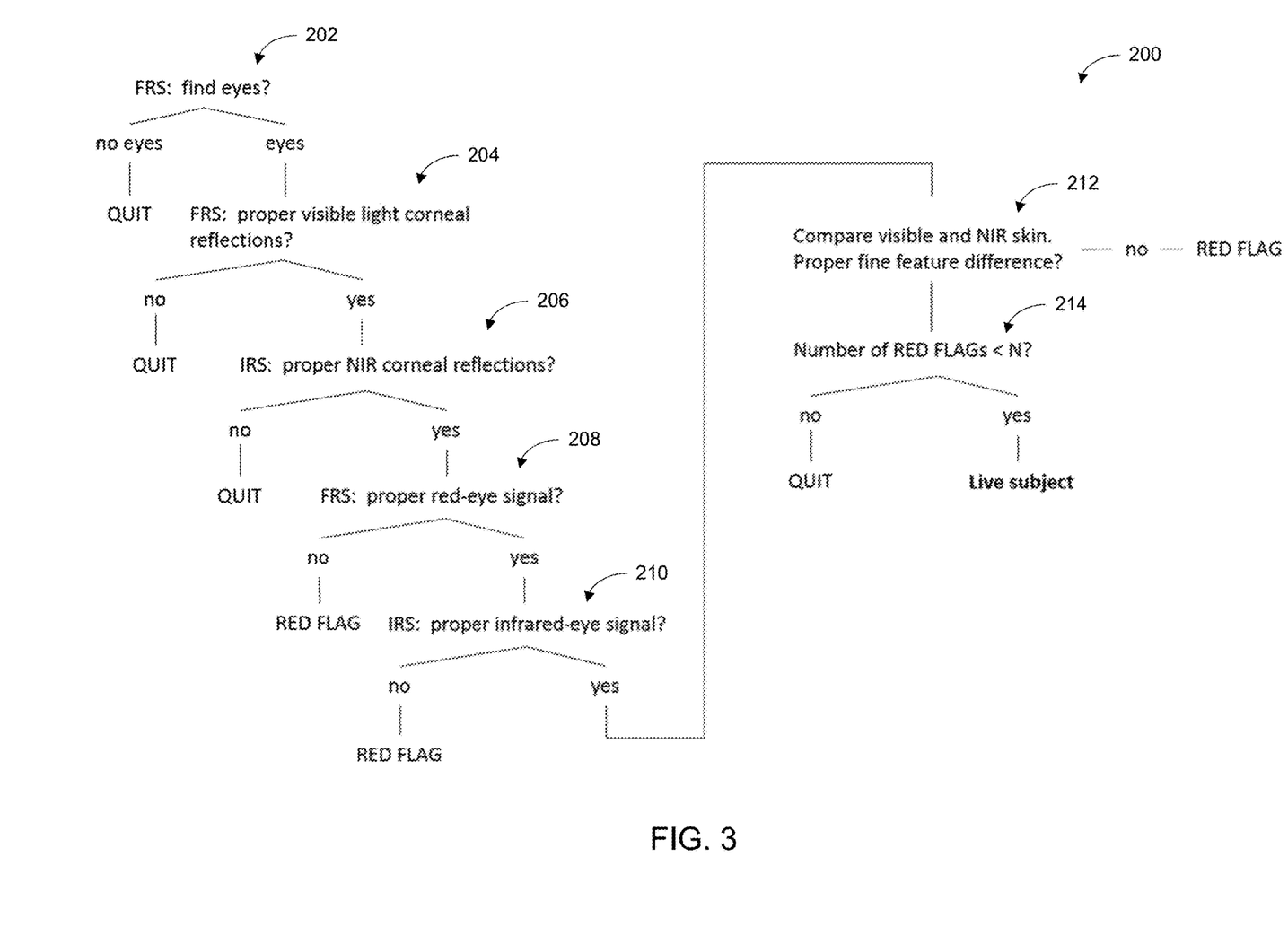
FIG. 3 is a flowchart illustrating an exemplary process of implementing an multi-modal biometric analysis system in accordance with the present disclosure.

FIG. 3 is a flowchart illustrating an exemplary process 200 of implementing the system 100. The process 200 involves implementation of a face finder (e.g., a face recognition subsystem 104) followed by tests of corneal specular reflections in visible and NIR spectra. The process 200 also involves a test for bright pupils that result from retinal retro-reflection in visible and NIR spectra. The process 200 further involves a test of skin texture for differential penetration of visible and NIR light. A similar process 200 can be used that involves tests for differential shadowing in a variety of spectra and/or a test that does not rely on the retinal retro-reflection testing. The system 100 can be customized or tailored for the combination of multi-modal methods based on the available hardware, total cost and/or time available to execute the testing.

To begin, at step 202, the face recognition subsystem 104 (FRS) is used to find or detect the eyes of the subject. If no eyes are found, the authentication process stops and the system 100 can output a signal (e.g., a message, audio, visual, combinations thereof, or the like) indicating an improper or unsuccessful authentication. If the eyes are found, at step 204, the face recognition subsystem 104 is used to find visible specular corneal reflections, and the system 100 determines whether the reflections legitimately correspond to visible illumination sources 110. If the determination is that the reflections do not legitimately correspond to visible illumination sources 110, the authentication process stops and an unsuccessful authentication signal is output to the subject.

If the determination is that the reflections legitimately correspond to visible illumination sources 110, at step 206, the iris recognition subsystem 102 (IRS) is informed as to the eye positions such that the iris recognition subsystem 102 can acquire iris images, and based on the captured images the iris recognition subsystem 102 determines whether NIR specular corneal reflections in the iris images correspond to NIR illumination sources 108. In some embodiments, a single frame can be used for locating the eyes and a single frame can be used for analyzing the specular corneal reflections. If a proper correspondence is not found, the authentication process stops and an unsuccessful authentication signal is output to the subject. If a proper correspondence is found, at step 208, a visible red-eye illumination source 110 is turned on, face images are acquired with the face recognition subsystem 104, and the face recognition subsystem 104 determines whether the color of the pupils responded appropriately to the red-eye illumination source 110.

If the pupils are found to not respond appropriately, an internal alarm can be initiated as a precaution against a spoof. At step 210, whether the pupils are found to respond appropriately or not, the system 100 turns on the NIR illumination source 108, acquires iris images with the iris recognition subsystem 102, and determines whether the pupil color responded to the infrared-eye illumination source 108. In some embodiments, a single frame can be used for the red-eye analysis and a single frame can be used for the pupil color analysis. If the pupil color is found to respond inappropriately or there is no response, a secondary internal alarm can be initiated as a precaution against a spoof. If the pupil color is found to respond appropriately, at step 212, the skin texture of the NIR images that show skin in the ocular region and visible light images that show the same patches of skin are compared. In some embodiments, the previous four frames can be used for the skin analysis. If fine wrinkle features appear in both visible and NIR images that are substantially equivalent, a tertiary internal alarm can be initiated as a precaution against a spoof.

At step 214, the system 100 determines the number of internal alarms that have been initiated. If the process 200 completes and the internal alarm count is less than a preset number, e.g., 2, the system 100 can determine that the subject is real. If the internal alarm count is not less than the present number, the system 100 can determine that the subject is a presentation spoof and the system 100 can refuse authentication of the user even if the irises and/or face match to an enrolled user. Based on the internal alarm count determination in step 214, the system 100 can respond positively or negatively to the subject regarding authentication depending on the findings of the system 100, and further records and/or displays the results of the authentication to the subject.

In some embodiments, the process 200 can be pared down to include only one test for each of the subsystems 102, 104. If either test returns a negative result, the overall decision of the system 100 can be negative and the subject is refused access or denied whatever they had been seeking in using the system 100. In some embodiments, the system 100 can be started by the subject by proximity, action or other indication. In some embodiments, the control of the illumination sources 108, 110 and the cameras 114, 116 can be based on a decision tree algorithm that maximizes the level of difficulty to spoof the system 100. In some embodiments, the vision algorithms executed by the processing device 128 can include eye-finding, corneal specularity finding and testing, pupil finding and testing, and skin texture evaluation and comparison. Thus, the system 100 exploits information from multiple biometric modes to determine the subject authenticity, with such authenticity determined based on a comparison of the biometric modes between the subsystems 102, 104.

Relying on multiple biometric modes provides significant advantages of the system 100 over existing biometric analysis systems. Traditional anti-spoofing systems generally operate with a given level of difficulty associated with a single modality. For example, a demonstrated iris spoof with contact lenses on a two-dimensional, accurate, NIR iris image can be used to produce realistic specular reflections and spoof the traditional system. In contrast, a two-dimensional NIR-accurate set of iris images with contact lenses added to create realistic corneal reflections in the visible and NIR spectra would still be flagged as a spoof by the system 100 if the retinal retro-reflections in the visible and NIR spectra, spectral differences in skin texture between visible and NIR spectra, and/or differential shadowing due to spatially separate illumination sources, were absent during the additional modality being tested. A more accurate authentication can therefore be performed.

It should be understood that variations of the system 100 can be implemented. In some embodiments, the visible and/or NIR face camera 116 be exchanged for or augmented with a thermal infrared (IR) camera sensitive to approximately 8 microns to approximately 14 microns radiation, or a an ultraviolet (UV) enhanced camera (long part of the UV spectrum with $\lambda >$approximately 380 nm). A successful spoof would therefore need to present the proper characteristics in the additional spectral ranges using the thermal IR or UV enhanced camera. In some embodiments, the red and blue bands of a visible camera can be compared to the NIR camera iris and ocular area images to ensure that the spectral characteristics show proper live-tissue characteristics, e.g., different iris texture and different skin texture.

In some embodiments, the modalities can be changed, e.g., to iris and fingerprint, iris and voice, face and gait, iris and/or face and palm structure, iris and/or face and palm vein structure, combinations thereof, or the like. The implementation of face and iris biometric data is based on the commonality of features viewed by each of the modalities, e.g., corneal reflections, and therefore the relative ease of comparing these features. In the case of more disparate modalities, e.g., face and gait, the system 100 can observe the face of the subject and, separately, the subject's gait to evaluate each as a potential spoof. In the case of face and iris recognition modalities, additional features can be incorporated into the system 100 in anticipation of presentation attacks.

For example, the system 100 can analyze the iris imagery for color using the face camera 116 since typical iris imagery is grayscale and real irises and ocular regions are in color. The system 100 can examine the iris/sclera contrast in visible and NIR spectra which are different for a live eye. In some embodiments, the multiple face illumination sources 110 can be replaced with multiple face cameras 116 to determine the three-dimensionality of the subject. In some embodiments, the three-dimensionality of the subject can be sensed using detection of the differential shadowing discussed above. In some embodiments, active anti-spoofing means can be incorporated into the system 100. Active anti-spoofing systems necessitate a response from the subject, e.g., eye blinks, head turns, speech (moving lips), gaze direction changes, combinations thereof, or the like, and the response from the subject can be analyzed in combination with one or more of the modalities discussed herein.

In some embodiments, the system 100 can be used to provide multi-modal recognition capabilities using the same captured imagery and different algorithms. For example, submitting the iris and face images 120 to appropriate recognition tools of the system 100 can return similarity scores to an enrolled database of users (either enrolled as whitelist or blacklist). Matching scores in multiple modalities provide a higher confidence than a matching score from a single modality. In some embodiments, a subsystem designed to analyze spectral differences in skin texture can, in and of itself, represent a biometric modality.

Figure 4:
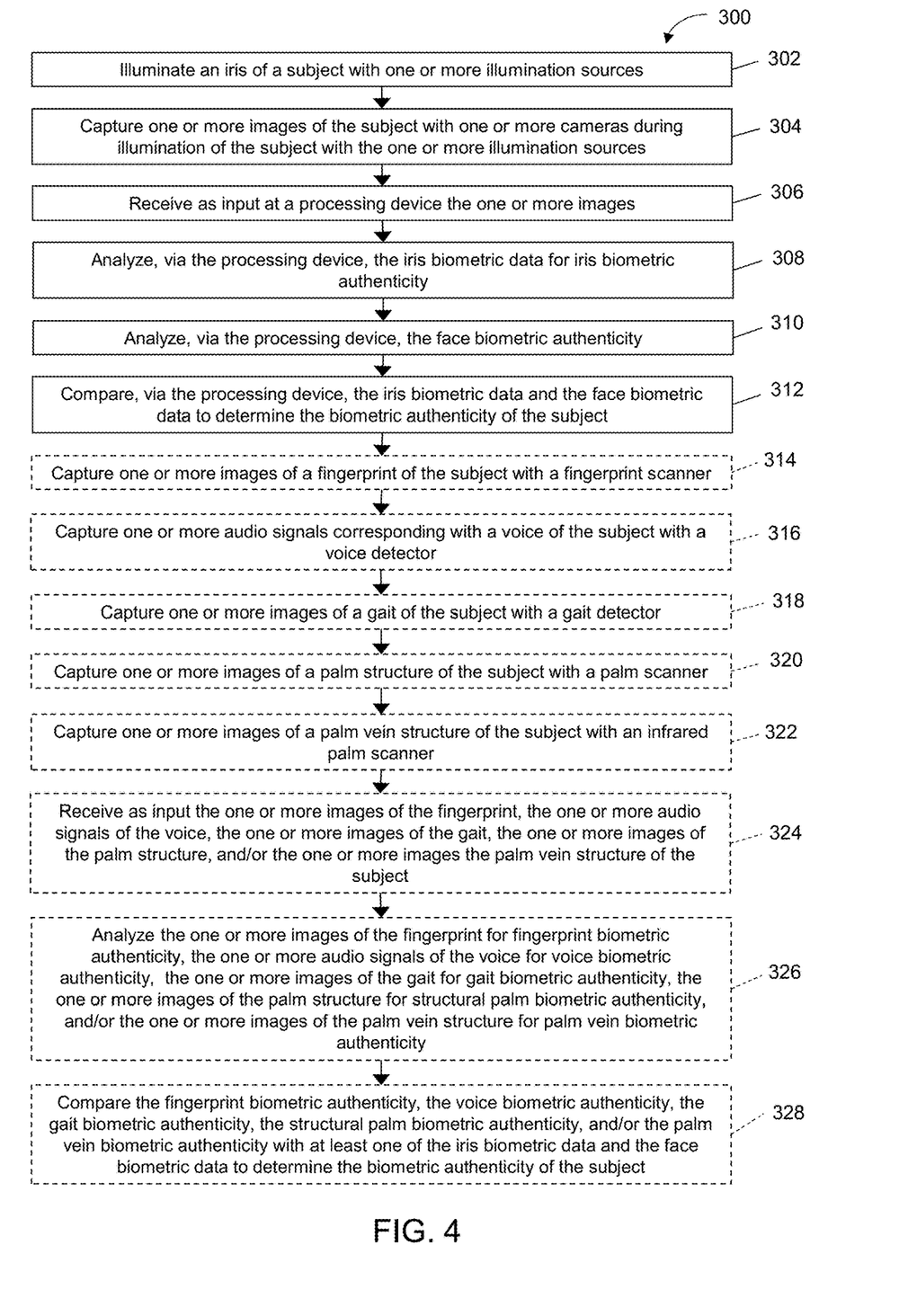
FIG. 4 is a flowchart illustrating an exemplary process of implementing an multi-modal biometric analysis system in accordance with the present disclosure.

FIG. 4 is a flowchart illustrating an exemplary process 300 of implementing the system 100. To begin, at step 302, an iris of the subject is illuminated with one or more illumination sources. At step 304, one or more images of the subject are captured with one or more cameras during illumination of the subject with the one or more illumination sources. At step 306, the processing device receives as input the one or more images. At step 308, the processing device analyzes the iris biometric data in the images for iris biometric authenticity. At step 310, the processing device analyzes the face biometric data in the images for face biometric authenticity. At step 312, the processing device compares the iris biometric data and the face biometric data to determine the final biometric authenticity of the subject.

In some embodiments, at step 314, one or more images of a fingerprint of the subject can be captured with a fingerprint scanner. In some embodiments, at step 316, one or more audio signals corresponding with the voice of the subject can be captured with a voice detector. In some embodiments, at step 318, one or more images of a gait of the subject can be captured with a gait detector. In some embodiments, at step 320, one or more images of a palm structure of the subject can be captured with a palm scanner. In some embodiments, at step 322, one or more images of a palm vein structure of the subject can be captured with an infrared palm scanner. In such embodiments, at step 324, the one or more images of the fingerprint, the one or more audio signals of the voice, the one or more images of the gait, the one or more images of the palm structure, and/or the one or more images of the palm vein structure of the subject can be received as input at the processing device. At step 326, the one or more images of the fingerprint, the one or more audio signals of the voice, the one or more images of the gait, the one or more images of the palm structure, and/or the one or more images of the palm vein structure can be analyzed with the processing device for fingerprint biometric authenticity, voice biometric authenticity, gait biometric authenticity, structural palm biometric authenticity, and palm vein biometric authenticity, respectively. At step 328, the fingerprint biometric authenticity, the voice biometric authenticity, the gait biometric authenticity, the structural palm biometric authenticity, and/or the palm vein biometric authenticity can be compared with at least one of the iris biometric data and the face biometric data to determine the final biometric authenticity of the subject.

Figure 5:
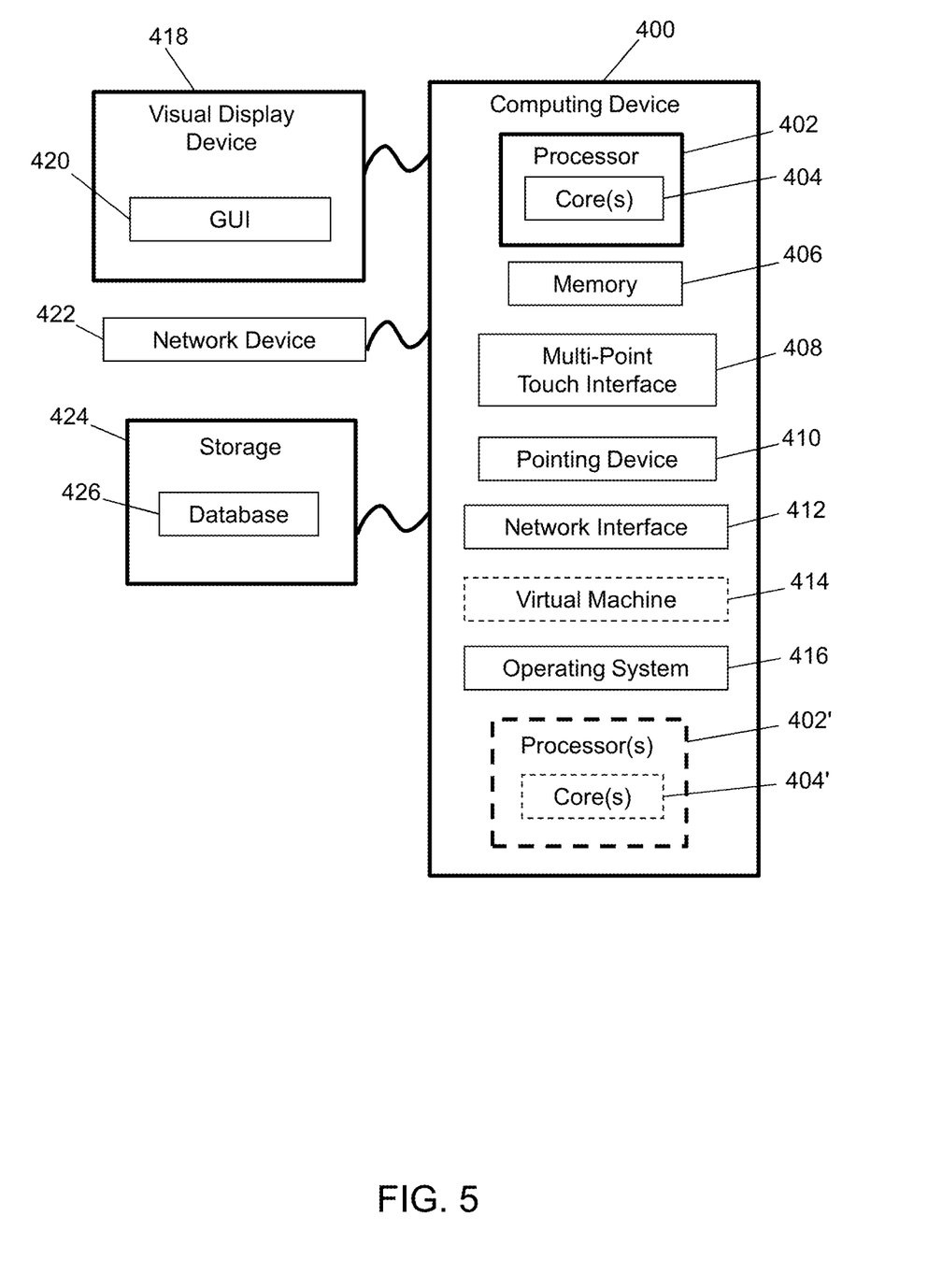
FIG. 5 is a block diagram of an exemplary computing device for implementing an exemplary multi-modal biometric analysis system in accordance with the present disclosure.

FIG. 5 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for operating the subsystems, instructions for operating the illumination sources, instructions for operating the processing device, instructions for operating the cameras, instructions for operating the communication interface, instructions for operating the user interface, instructions for operating the central computing system, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display one or more user interfaces 420 (e.g., a graphical user interface) that may be provided in accordance with exemplary embodiments. The computing device 400 may include other I/O devices for receiving input from a user, for example, a camera, a keyboard, a fingerprint scanner, microphone, or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the multi-modal biometric analysis systems described herein. Exemplary storage device 424 may also store one or more databases 426 for storing any suitable information required to implement exemplary embodiments. For example, exemplary storage device 424 can store one or more databases 426 for storing information, such as data relating to images, authentication responses, biometric data, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, PCI/PCIe network adapter, SD adapter, Bluetooth adapter, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 6:
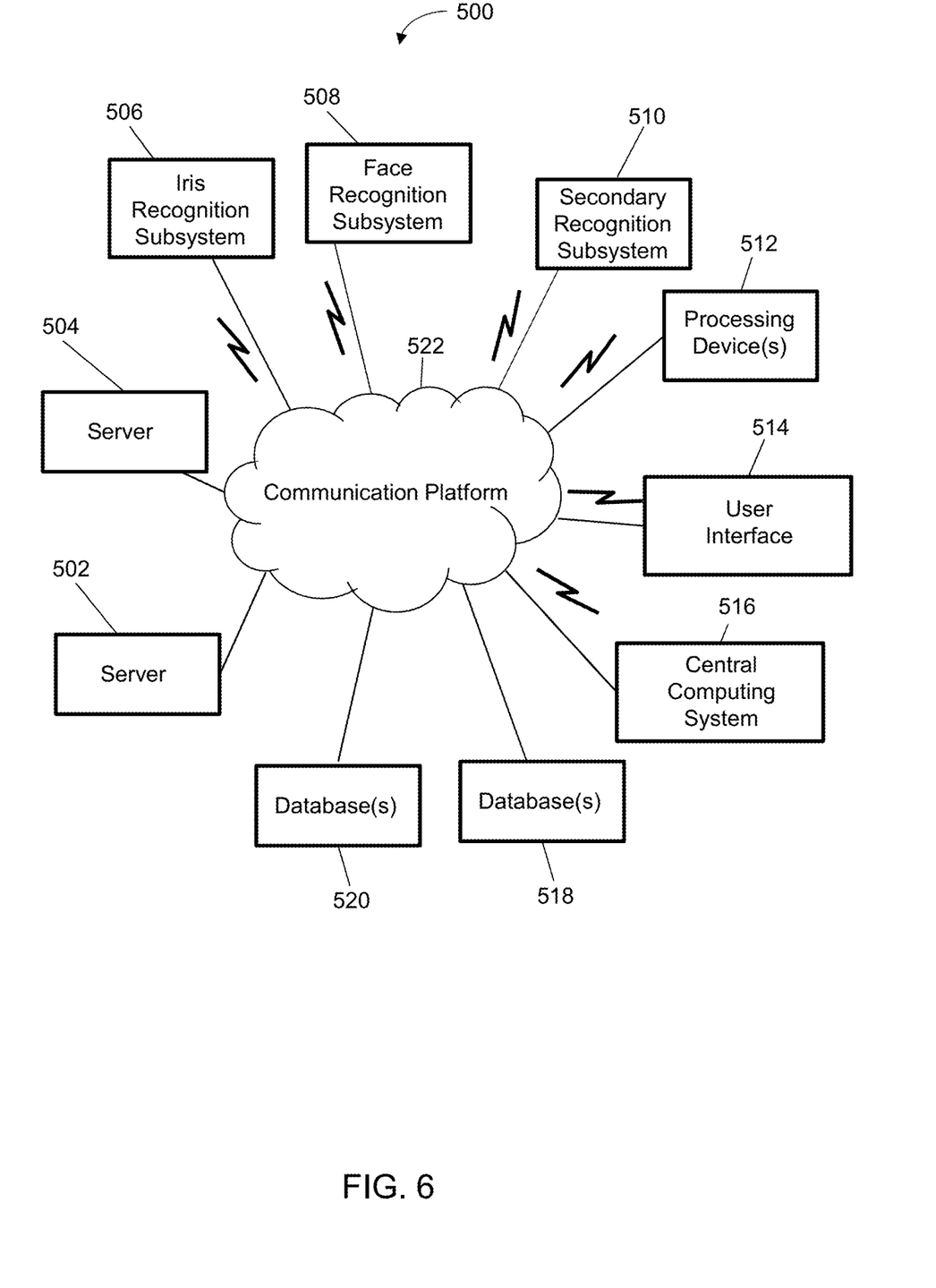
FIG. 6 is a block diagram of an exemplary multi-modal biometric analysis system environment in accordance with the present disclosure.

FIG. 6 is a block diagram of an exemplary multi-modal biometric analysis system environment 500 in accordance with exemplary embodiments of the present disclosure. The environment 500 can include servers 502, 504 configured to be in communication with one or more iris recognition subsystems 506, face recognition subsystems 508, secondary recognition subsystems 510, processing devices 512, a user interface 514, and a central computing system 516 via a communication platform 522, which can be any network over which information can be transmitted between devices communicatively coupled to the network. For example, the communication platform 522 can be the Internet, Intranet, virtual private network (VPN), wide area network (WAN), local area network (LAN), and the like. In some embodiments, the communication platform 522 can be part of a cloud environment.

The environment 500 can include repositories or databases 518, 520, which can be in communication with the servers 502, 504, as well as the iris recognition subsystem 506, the face recognition subsystem 508, the secondary recognition subsystem 510, the processing devices 512, the user interface 514, and the central computing system 516, via the communications platform 522.

In exemplary embodiments, the servers 502, 504, the iris recognition subsystem 506, the face recognition subsystem 508, the secondary recognition subsystem 510, the processing devices 512, the user interface 514, and the central computing system 516 can be implemented as computing devices (e.g., computing device 400). Those skilled in the art will recognize that the databases 518, 520 can be incorporated into one or more of the servers 502, 504. In some embodiments, the databases 518, 520 can store data relating to images, authentication responses, biometric data, combinations thereof, or the like, and such data can be distributed over multiple databases 518, 520.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A multi-modal biometric analysis system, comprising:
   one or more illumination sources configured to illuminate an iris of a subject;
   one or more cameras configured to capture one or more images of the subject during illumination of the subject with the one or more illumination sources, the one or more images including iris biometric data associated with the iris of the subject and face biometric data associated with a face of the subject; and
   a processing device in communication with the one or more illumination sources and the one or more cameras, the processing device configured to:
   (i) receive as input the one or more images;
   (ii) analyze the iris biometric data for iris biometric authenticity, wherein analyzing the iris biometric data includes a determination of existence of retinal retro-reflection from a pupil of the subject in the one or more images, and wherein detection of the retinal retro-reflection from the pupil of the subject is indicative of an authentic live eye of the subject;
   (iii) analyze the face biometric data for face biometric authenticity; and
   (iv) compare the iris biometric data and the face biometric data to determine a biometric authenticity of the subject.

2. The multi-modal biometric analysis system of claim 1, wherein the one or more illumination sources comprise an iris illumination source and a face illumination source.

3. The multi-modal biometric analysis system of claim 2, wherein the iris illumination source is configured to illuminate the iris of the subject with near infrared light.

4. The multi-modal biometric analysis system of claim 2, wherein the face illumination source is configured to illuminate at least a portion of the face of the subject.

5. The multi-modal biometric analysis system of claim 2, wherein the face illumination source is configured to illuminate the face of the subject with at least one of near infrared light and visible light.

6. The multi-modal biometric analysis system of claim 1, wherein the iris biometric authenticity includes corneal reflections.

7. The multi-modal biometric analysis system of claim 1, wherein the face biometric authenticity includes skin texture under near infrared light.

8. The multi-modal biometric analysis system of claim 1, wherein the face biometric authenticity includes facial shadow identification.

9. The multi-modal biometric analysis system of claim 1, wherein the face biometric authenticity includes eye position detection.

10. The multi-modal biometric analysis system of claim 1, wherein the one or more illumination sources are configured to illuminate the face of the subject at varying time sequences.

11. The multi-modal biometric analysis system of claim 10, wherein the face biometric authenticity includes detection of time-varying facial shadows.

12. The multi-modal biometric analysis system of claim 1, wherein the one or more illumination sources include two off-axis illumination sources configured to illuminate the face of the subject from spatially separated directions.

13. The multi-modal biometric analysis system of claim 1, comprising at least one of a fingerprint scanner, a voice detector, a gait detector, a palm scanner, and an infrared palm scanner.

14. The multi-modal biometric analysis system of claim 13, wherein the fingerprint scanner is configured to capture one or more images of a fingerprint of the subject, the voice detector is configured to capture one or more audio signals corresponding with a voice of the subject, the gait detector is configured to capture one or more images of a gait of the subject, the palm scanner is configured to capture one or more images of a palm structure of the subject, and the infrared palm scanner is configured to capture one or more images of a palm vein structure of the subject.

15. The multi-modal biometric analysis system of claim 14, wherein the processing device is configured to receive as input the one or more images of the fingerprint of the subject, analyze the one or more images of the fingerprint of the subject for fingerprint biometric authenticity, and compare the fingerprint biometric authenticity with at least one of the iris biometric data and the face biometric data to determine the biometric authenticity of the subject.

16. The multi-modal biometric analysis system of claim 14, wherein the processing device is configured to receive as input the one or more audio signals corresponding with the voice of the subject, analyze the one or more audio signals for voice biometric authenticity, and compare the voice biometric authenticity with at least one of the iris biometric data and the face biometric data to determine the biometric authenticity of the subject.

17. The multi-modal biometric analysis system of claim 14, wherein the processing device is configured to receive as input the one or more images of the gait of the subject, analyze the one or more images of the gait of the subject for gait biometric authenticity, and compare the gait biometric authenticity with at least one of the iris biometric data and the face biometric data to determine the biometric authenticity of the subject.

18. The multi-modal biometric analysis system of claim 14, wherein the processing device is configured to receive as input the one or more images of the palm structure of the subject, analyze the one or more images of the palm structure of the subject for structural palm biometric authenticity, and compare the structural palm biometric authenticity with at least one of the iris biometric data and the face biometric data to determine the biometric authenticity of the subject.

19. The multi-modal biometric analysis system of claim 14, wherein the processing device is configured to receive as input the one or more images of the palm vein structure of the subject, analyze the one or more images of the palm vein structure of the subject for palm vein biometric authenticity, and compare the palm vein biometric authenticity with at least one of the iris biometric data and the face biometric data to determine the biometric authenticity of the subject.

* * * * *